(12) United States Patent
Fensch

(10) Patent No.: US 6,278,868 B1
(45) Date of Patent: *Aug. 21, 2001

(54) TRANSCEIVER CIRCUIT INCLUDING A CIRCUIT FOR MEASURING THE DELAY INTRODUCED BY TELEPHONE LINES

(75) Inventor: Thierry Fensch, Grenoble (FR)

(73) Assignee: SGS-Thomson Microelectronics S.A., Gentilly (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,519

(22) Filed: Jun. 17, 1998

(30) Foreign Application Priority Data

Jun. 27, 1997 (FR) .................................. 97 08364

(51) Int. Cl.[7] ........................................ H04B 1/06
(52) U.S. Cl. ...................... 455/260; 370/350; 375/327
(58) Field of Search ...................... 455/260, 502, 455/265; 370/350, 516, 503; 375/327, 355, 356, 359, 362, 375

(56) References Cited

U.S. PATENT DOCUMENTS

| 4,355,387 | 10/1982 | Portejoie et al. .................. 370/102 |
| 4,808,884 | * 2/1989 | Hull et al. ........................ 375/120 |
| 5,272,694 | 12/1993 | Bourgart et al. .................. 370/31 |
| 5,631,757 | * 5/1997 | Hull et al. ........................ 359/113 |
| 5,751,775 | * 5/1998 | Fensch et al. .................... 375/371 |

FOREIGN PATENT DOCUMENTS

| 0 666 677 | 8/1995 | (EP) ........................... H04M/1/72 |
| 0 680 170 | 11/1995 | (EP) ........................... G04L/7/033 |
| 0 751 634 | 1/1997 | (EP) ........................... H04B/7/26 |

OTHER PUBLICATIONS

Preliminary French Search Report for Application No. 9708364, filed Jun. 27, 1997.

* cited by examiner

Primary Examiner—William Trost
Assistant Examiner—Tilahon Gesesse
(74) Attorney, Agent, or Firm—Wolf, Greenfield & Sacks, P.C.; James H. Morris; Theodore E. Galanthay

(57) ABSTRACT

The present invention relates to a master transceiver circuit meant to be coupled by a telephone line to a slave transceiver circuit, the master circuit including a digital phase-locked loop for reconstructing a clock from an incoming bit flow, the phase difference between the reconstructed clock and an internal clock corresponding to the content of a phase counter of the phase-locked loop. The circuit includes a bit counter clocked by the internal clock, initialized upon transmission of a predetermined signal, and stopped upon detection of the return of the predetermined signal transmitted back by the slave transceiver circuit; and means for calculating the delay introduced by the telephone line based on the contents of the phase and bit counters.

17 Claims, 3 Drawing Sheets

TRANSCEIVER CIRCUIT INCLUDING A CIRCUIT FOR MEASURING THE DELAY INTRODUCED BY TELEPHONE LINES

BACKGROUND OF THE INVENTION

1. Field of the Invention

The present invention relates to a so-called U interface transceiver circuit for an ISDN transmission. The present invention more specifically relates to the use of such a circuit on lines connecting base stations to a base station controller in a radiotelephony network according to the DECT standard.

2. Discussion of the Related Art

FIG. 1 schematically and partially shows a DECT telephone network. This network includes a cluster of base stations 10, each of which covers a cell 12 in which a user can correspond with the base station by radio communication. The base stations are connected to a common base station controller 14, itself connected to a central office 16.

The lines between the base stations and the base station controller introduce different transmission delays, due to the different line lengths. Further, the delay introduced by a line is likely to vary, especially according to the temperature.

When a user exits a cell 12 covered by a first base station 10, he normally enters into an adjacent cell covered by a new base station. Thus, the telephone communication must be taken over by the new base station without disturbance. However, the lines of the initial station and of the new station can introduce such different delays that they greatly disturb the communication, to the point of interrupting it.

Accordingly, base station controller 14 must know the delays introduced by each of the lines connecting it to a base station, to properly manage the transition from one line to the other.

It is desired, in such a situation, to be able to measure the different delays introduced by the lines at the level of the transceiver circuits of base station controller 14.

FIG. 2 partially and schematically shows a conventional transceiver circuit, or U interface, such as that described in European patent application 0680170 which application is incorporated herein by reference. FIG. 2 more specifically shows the elements meant for reconstructing a reception clock signal from the data received over the line.

This circuit includes a divider 20 (a counter to 192) generating a 80-kHz internal clock signal based on a 15.36-MHz signal CK. This internal clock signal forms transmission clock TxCK. This transmission clock clocks a transmission circuit 22 which forms transmission frames Tx from exiting messages MSGo. The incoming frames Rx are provided to an analog-to-digital converter 24 which is clocked by a reception clock RxCK to sample each incoming bit. The samples are provided by converter 24 to a first-in-first-out type memory (FIFO) 26 before being provided to a digital signal processor (DSP) 28. FIFO memory 26 is selected in the write mode by reception clock RxCK and selected in the read mode by internal clock TxCK. Signal processor 28 regenerates the incoming message MSGi from the samples read from FIFO memory 26.

Clock RxCK varies at the frequency of a digital sum generated by an adder 30 which receives, on a first input, the content of divider 20 and, on a second input, the content of a counter 32 containing phase information $\phi$. The content of counter 32 varies modulo the division rate (192) of divider 20. Adder 30 also provides a value modulo this division rate. Signal RxCK is formed, for example, of the most significant bit MSB generated by adder 30.

With this configuration, the phase of signal RxCK with respect to signal TxCK is determined by the content of counter 32, as will be described in relation with FIG. 3.

Signal processor 28 analyzes the samples provided by converter 24 and modifies the content of counter 32 so that clock RxCK samples incoming signal Rx at the level of its maximum and minimum amplitudes. In this example, signal processor 28 modifies the content of counter 32 by a setting to the counting or downcounting mode u/d, counter 32 being clocked by clock TxCK.

Processor 28, counter 32 and adder 30 actually form a digital phase-locked loop to reconstruct the reception clock signal from incoming signal Rx.

FIG. 3 illustrates the evolution of the contents of divider 20 and of sum $\Sigma$ generated by adder 30 as a function of time. The content of divider 20 varies in a saw-tooth from 0 to 191. Clock TxCK corresponds, for example, to the most significant bit of the content of divider 20. Then, it exhibits a high state when the content of divider 20 exceeds value 128.

Sum $\Sigma$ generated by adder 30 also varies in a saw-tooth from 0 to 191, but is out of phase with respect to the content of divider 20 by a value corresponding to the content $\phi$ of counter 32. In fact, value $\omega$ is subtracted to the content of divider 20 to generate a phase lag of signal $\Sigma$, such that sum $\Sigma$ is zero when the content of divider 20 is equal to $\omega$. Like signal TxCK, signal RxCK exhibits a high state when sum $\Sigma$ exceeds 128.

SUMMARY OF THE INVENTION

An object of the present invention is to modify a conventional transceiver circuit to enable it to measure the delay introduced by the telephone line to which it is connected.

The present invention more specifically relates to a master transceiver circuit meant to be coupled by a telephone line to a slave transceiver circuit, the master circuit including a digital phase-locked loop for reconstructing a clock from an incoming bit flow, the phase difference between the reconstructed clock and an internal clock corresponding to the content of a phase counter of the phase-locked loop. The circuit includes a bit counter clocked by the internal clock, initialized upon transmission of a predetermined signal, and stopped upon detection of the return of the predetermined signal transmitted back by the slave transceiver circuit; and means for calculating the delay introduced by the telephone line based on the contents of the phase and bit counters.

According to an embodiment of the present invention, the circuit includes a FIFO-type memory, in which digital samples corresponding to the received bits are written at the rate of the reconstructed clock and in which the samples are read at the rate of the internal clock to be analyzed by the digital phase-locked loop. The detection of the return of the predetermined signal is performed downstream of the FIFO memory, the delay being corrected according to the difference between the read and write pointers of the FIFO memory.

According to an embodiment of the present invention, the predetermined signal is a super-frame synchronization signal.

According to an embodiment of the present invention, the circuit is connected on a line connecting a base station to a base station controller in a radiotelephony network according to the DECT standard.

The foregoing as well as other objects, features and advantages of the present invention will be discussed in

DETAILED DESCRIPTION

The present invention applies to a telephone line connecting two digital transceiver circuits of U interface type, one of the transceiver circuits being a master circuit, and the other a slave circuit. The master circuit is provided to periodically transmit synchronization data that the slave circuit transmits back to the master circuit. To measure the delay introduced by the telephone line, the present invention provides, in a master transceiver circuit, to measure the time taken by the synchronization data to return. Preferably, the superframe synchronization data that are transmitted with a period (12 ms) which is relatively long but sufficient to be able to follow possible variations of the delay introduced by the line, due to temperature variations, for example, will be chosen.

Figure 1:
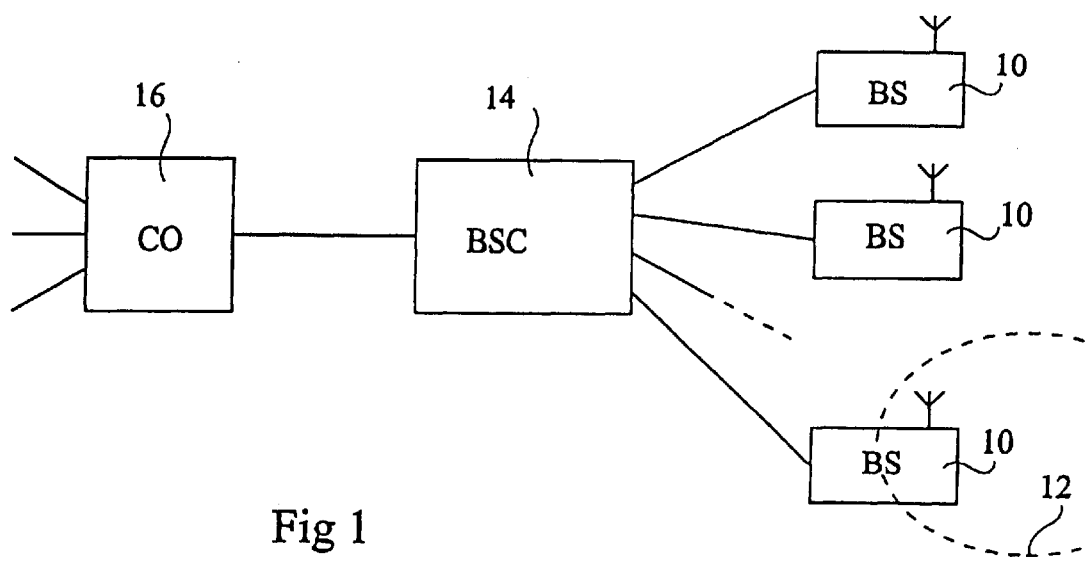
FIG. 1, previously described, schematically and partially shows a radiotelephone network according to standard DECT.
Figure 2:
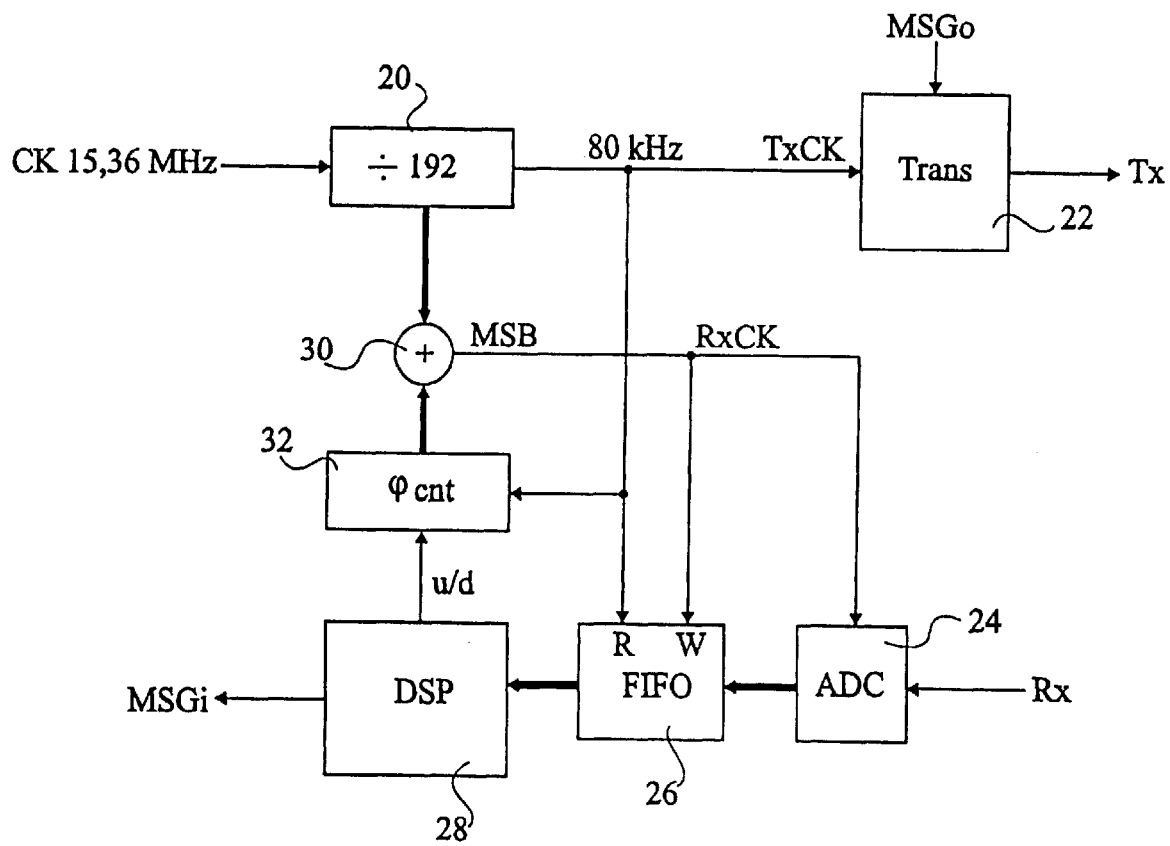
FIG. 2 shows a conventional transceiver circuit to which the present invention applies.
Figure 3:
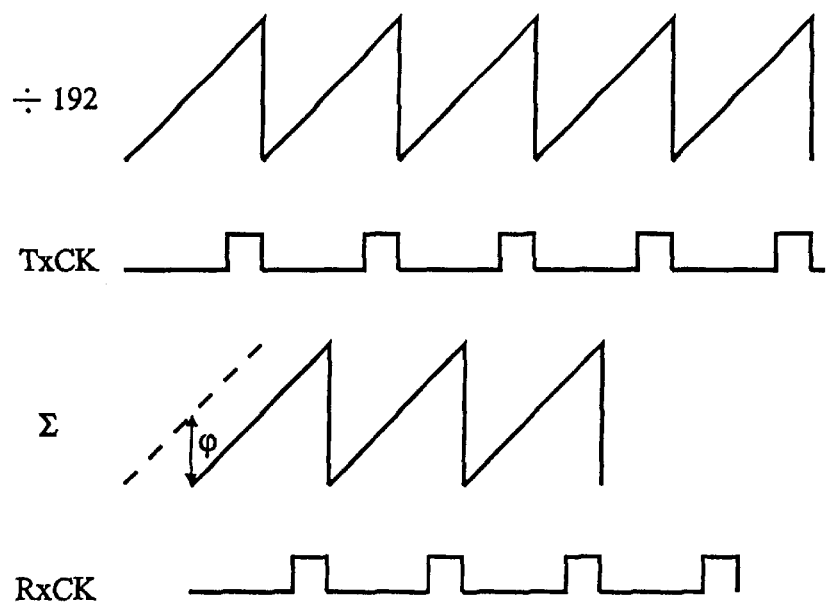
FIG. 3 illustrates variations of contents of counters and of signals of the circuit of FIG. 2.
Figure 4:
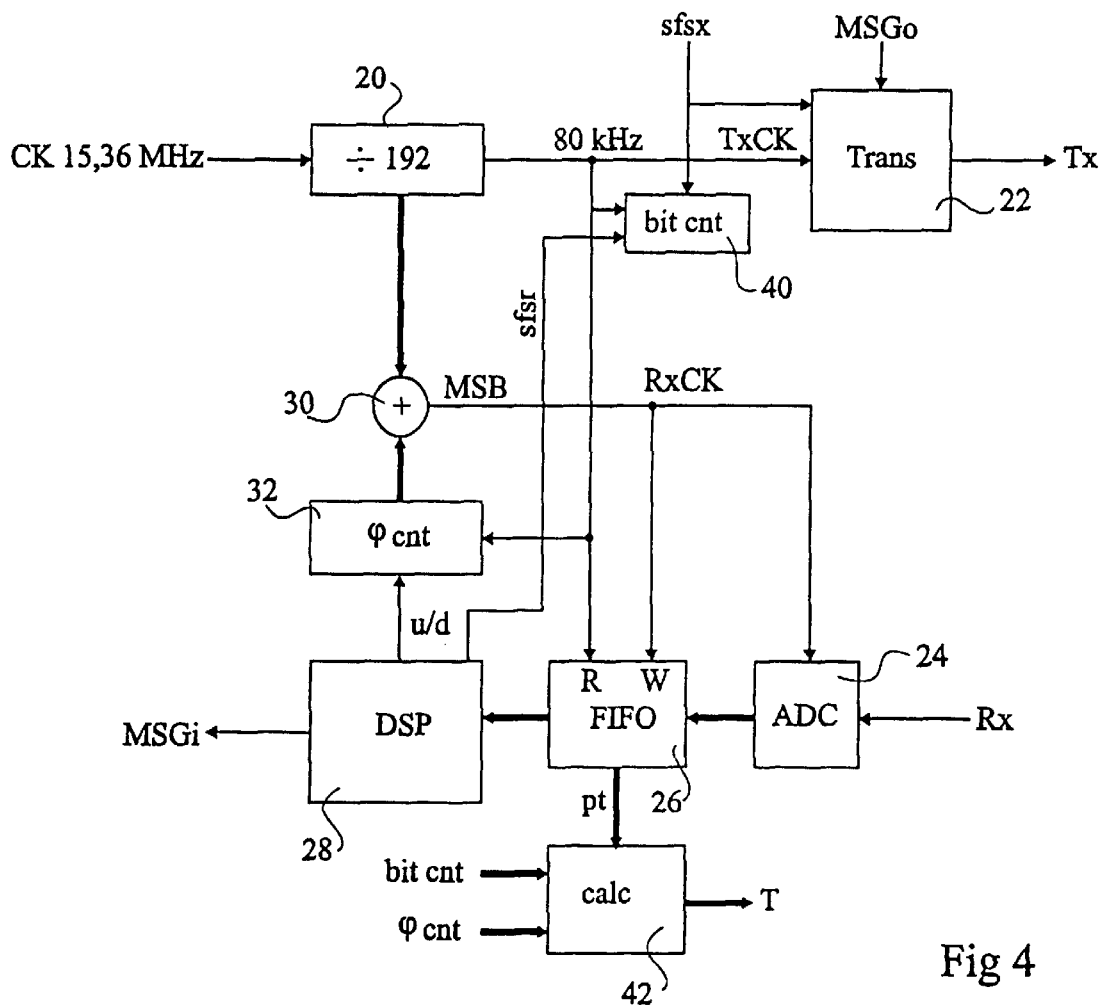
FIG. 4 shows an example of modifications of the circuit of FIG. 2 to implement the present invention.

In FIG. 4, the transceiver circuit of the type described in relation with FIG. 2 includes a bit counter 40 clocked by internal clock signal TxCK. Counter 40 is initialized when a superframe synchronization signal SFSX is provided to transmission circuit 22. Counter 40 is stopped when signal processor 28 transmits a signal sfsr indicating that it has detected the return of the superframe synchronization signal. Thus, as soon as processor 28 transmits signal sfsr, counter 40 contains the number of periods of clock TxCK, or the number of bits separating the provision of signal sfsx to transmission circuit 22 from the provision of signal sfsr by processor 28. This number of cycles corresponds to twice the delay introduced by the telephone line, increased by the latency times of transmission circuit 22, of the slave transceiver circuit at the other end of the line, of converter 24, of FIFO memory 26, and of signal processor 28. These latency times must also be taken into account to be able to properly transfer a communication from one line to another when the user moves between two cells.

However, the content of counter 40, which is updated at the frequency of internal clock TxCK (80 kHz), only provides a resolution of 12.5 μs, which is insufficient since the delay must be calculated to±300 ns.

An aspect of the present invention is to use the content of phase counter 32 to reach a sufficient measurement accuracy. If internal clock TxCK and reconstructed clock RxCK are in phase, the delay may be expressed precisely as an integer number of internal clock cycles. If the delay introduced by the line increases, this delay translates as a phase lag of the reconstructed clock with respect to the internal clock. Phase counter 32 precisely contains a value corresponding to this phase lag. Although counter 32 is clocked by a slow clock (TxCK), its content defines the phase lag with a resolution equal to the period, that is, 65 ns, of clock signal CK which rates divider 20.

Thus, a precise measurement T of the delay introduced by the line and the intermediary processing elements is provided, according to the present invention, by the sum of the contents of bit counter 40 and of phase counter 32, respectively weighted by the periods of signals TxCK and CK (12.5 μs and 65 ns). For this purpose, a calculation circuit 42, internal or external to the transceiver circuit, may be provided, which receives the contents of counters 32 and 40 and performs the adequate calculations to issue measurement T, possibly equal to the weighted sum decreased by the known latency times of the intermediary elements, expressed as integer cycles of internal clock TxCK.

Such a calculation provides proper results when FIFO memory 26 is omitted, that is, if it is acceptable to lose bits upon completion of a call.

If FIFO memory 26 is present, it appears to introduce a time lag which is constant during a call, but determined randomly upon completion of the call.

Figure 5A:
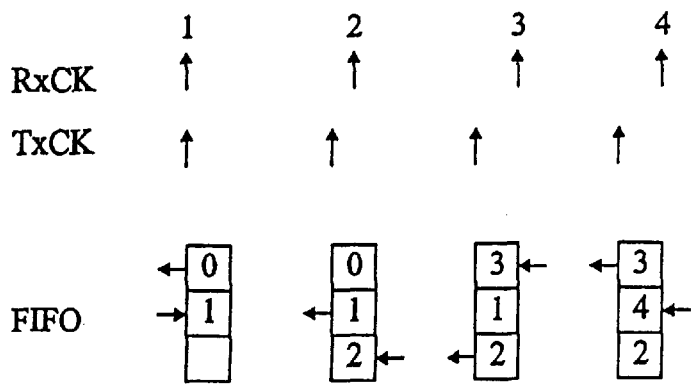
FIGS. 5A to 5C are meant to illustrate the influence of the FIFO memory of the circuit of FIG. 2 upon the calculation of the line delay, in different cases.
Figure 5B:
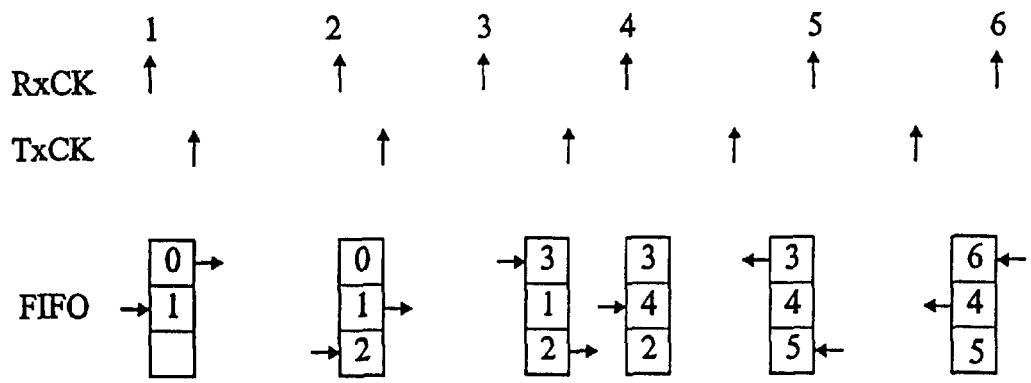
Figure 5C:
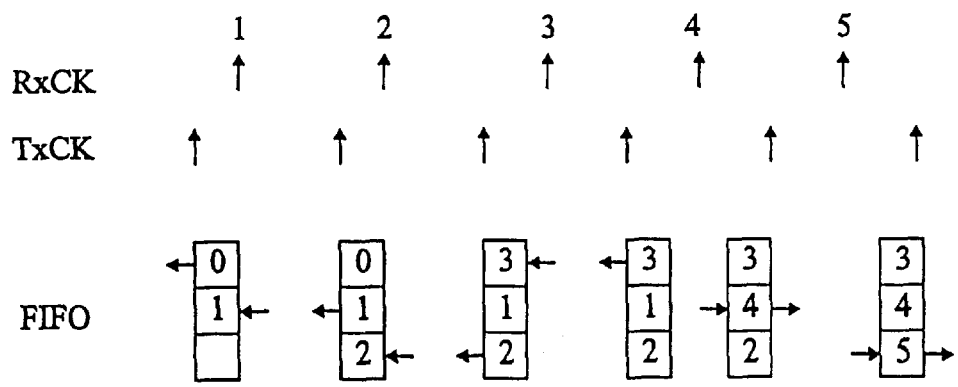

FIGS. 5A to 5C are meant to illustrate this phenomenon. These drawings show, in the form of vertical arrows, pulses of clocks RxCK and TxCK and illustrate the use of FIFO memory 26, formed, for example, of three registers to store the samples provided by converter 24. The samples of the incoming bits, arriving in synchronism with the pulses of reconstructed clock RxCK, are numbered by order of arrival.

At each pulse of clock RxCK, the current sample is written into the FIFO memory, which is indicated by an incoming arrow. At each pulse of clock TxCK, a previously written sample is read from the FIFO memory, which is indicated by an exiting arrow. The positions of the incoming and exiting arrows represent the write and read pointers. Each of these pointers is incremented for each access, the incrementations being performed in the drawings from the top to the bottom, with of course a looping back on the top register once the pointer has gone through all registers. Further, when two accesses are not simultaneous, an arrow on the left indicates the first access and an arrow on the right indicates the second one.

In FIG. 5A, clocks RxCK and TxCK are initially in phase, whereas, in steady state, clock RxCK is slightly delayed with respect to clock TxCK. In the case of FIG. 5A, the period of clock RxCK varies progressively so that each pulse of clock RxCK occurs with a slight delay close to a corresponding pulse of clock TxCK. From the third pulse on, clock RxCK is in its definitive phase relation with respect to clock TxCK.

For the first sample, access is simultaneously had in the write mode to the second register of the FIFO memory and in the read mode to the first register of the FIFO memory. For the second sample, access is first had in the read mode to the second register, then in the write mode to the third register. In steady state, that is, from the third sample on, the current sample is written as the just preceding sample is being read. Accordingly, the delay introduced by the FIFO memory is one cycle of clock TxCK.

In FIG. 5B, clock RxCK initially leads in phase with respect to clock TxCK while, in steady state, clock RxCK is delayed. In this example, the period of clock RxCK is progressively reduced to be increased again to reach the steady state. It should be noted that clock RxCK has one pulse too many with respect to clock TxCK. This additional pulse, for example, the fourth one, causes the writing of the fourth sample into a register of the FIFO memory while no corresponding sample is read. The steady state is reached from the fifth pulse of clock RxCK, the fourth pulse, in excess, having caused a shifting of the read and write pointers so that the sample read from the FIFO memory precedes by two ranks the sample being written. In other words, the FIFO memory introduces a delay of two cycles, and this, permanently from the fifth sample on, until the next completion of a call.

In FIG. 5C, clock RxCK is initially delayed with respect to clock TxCK whereas, in steady state, signal RxCK leads. Signal RxCK appears to have one pulse less than signal TxCK. As a result, for example, between the third and fourth pulses of clock RxCK, an additional reading from the FIFO memory is performed without performing any corresponding writing. Then, when signal RxCK is in steady state, from its fourth pulse on, the sample being read from a register of the FIFO memory is that which has just been written. Accordingly, here, the FIFO memory introduces no delay.

As a conclusion, referring to the case of FIG. 5A, FIFO memory 26 introduces, according to the conditions of completion of a call, a delay of plus or minus one cycle of clock TxCK. This random delay must of course be taken into account to provide a proper indication about the delay introduced by the line.

As shown in FIG. 4, calculation circuit 42 also receives read/write pointers pt of FIFO memory 26, the difference between the write pointer and the read pointer indicating if the value calculated according to the contents of counters 32 and 40 must be corrected by plus or minus one cycle. More specifically, if the pointer difference is equal to I (case of FIG. 5A), no correction is made. If the difference is equal to 2 (case of FIG. 5B), one cycle is added. Finally, if the difference is equal to 0 (case of FIG. 5C), one cycle is subtracted.

Of course, FIFO memory 26 can include any number n of registers. In this case, the correction to be made to the calculated delay is chosen among n values.

The present invention is likely to have various alterations, modifications, and improvements which will readily occur to those skilled in the art. Especially, FIFO memory 26 may be formed of a shift register clocked by reconstructed reception clock RxCK and controlled in the read mode by an automaton. The content of a state register of the automaton may then be exploited to know, in case of need, by which value the calculated delay must be corrected.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A master transceiver circuit meant to be coupled by a telephone line to a slave transceiver circuit, the master circuit including a digital phase-locked loop for reconstructing a clock from an incoming bit flow, a phase difference between the reconstructed clock and an internal clock corresponding to the content of a phase counter of the phase-locked loop, including:

a bit counter clocked by the internal clock, initialized upon transmission of a predetermined signal, and stopped upon detection of the return of the predetermined signal transmitted back by the slave transceiver circuit;

means for calculating the delay introduced by the telephone line based on the contents of the phase and bit counters; and a FIFO-type memory, in which digital samples corresponding to the received bits are written at the rate of the reconstructed clock and in which the samples are read at the rate of the internal clock to be analyzed by the digital phase-locked loop;

the detection of the return of the predetermined signal being performed downstream of the FIFO memory, the delay being corrected according to the difference between the read and write pointers of the FIFO memory.

2. The transceiver circuit of claim 1, including a FIFO-type memory, in which digital samples corresponding to the received bits are written at the rate of the reconstructed clock and in which the samples are read at the rate of the internal clock to be analyzed by the digital phase-locked loop;

the detection of the return of the predetermined signal being performed downstream of the FIFO memory, the delay being corrected according to the difference between the read and write pointers of the FIFO memory.

3. The transceiver circuit of claim 1, wherein the predetermined signal is a superframe synchronization signal.

4. The transceiver circuit of any of claim 1, connected on a line connecting a base station to a base station controller in a radiotelephony network according to a DECT standard.

5. The transceiver circuit of claim 1, wherein said digital phase-locked loop further includes a signal processor coupled downstream of said FIFO-type memory.

6. The transceiver circuit of claim 5, further including an analog-to-digital converter for receiving the incoming bit flow and having its output coupled to the FIFO-type memory.

7. The transceiver circuit of claim 6, wherein said signal processor analyzes the samples provided by the analog-to-digital converter and modifies the content of the phase counter.

8. The transceiver circuit of claim 7, wherein pointers of the FIFO-type memory couple to the calculation circuit.

9. A master transceiver circuit for coupling via a telephone line to a slave transceiver circuit, said master transceiver circuit comprising:

a digital phase-locked loop for providing a reconstructed clock signal from an incoming bit flow;

said phase-locked loop including a phase counter for providing a phase difference between said reconstructed clock signal and an internal clock signal;

a bit counter clocked by the internal clock signal;

said bit counter being initialized upon transmission of a predetermined signal, and stopped upon detection of the return of the predetermined signal transmitted back by the slave transceiver circuit;

a calculation circuit for receiving signals from both said phase counter and said bit counter for calculating the delay introduced by the telephone line based on the contents of the phase counter and the bit counter;

and a FIFO-type memory for receiving the incoming bit flow and having its output coupled to the digital phase-locked loop;

said FIFO-type memory having digital samples corresponding to the received bits being written at the rate of the reconstructed clock signal and having the samples read at the rate of the internal clock signal to be analyzed by the digital phase-locked loop;

whereby the detection of the return of the predetermined signal is performed downstream of the FIFO-type memory, the delay being corrected according to the difference between the read and write pointers of the FIFO-type memory.

10. The transceiver circuit of claim 9, wherein said digital phase-locked loop further includes a signal processor coupled downstream of said FIFO-type memory.

11. The transceiver circuit of claim 10, further including an analog-to-digital converter for receiving the incoming bit flow and having its output coupled to the FIFO-type memory.

12. The transceiver circuit of claim 11, wherein said signal processor analyzes the samples provided by the analog-to-digital converter and modifies the content of the phase counter.

13. The transceiver circuit of claim 12, wherein pointers of the FIFO-type memory couple to the calculation circuit.

14. A master transceiver circuit for coupling via a telephone line to a slave transceiver circuit, said master transceiver circuit comprising:

a digital phase-locked loop for providing a reconstructed clock signal from an incoming bit flow;

said phase-locked loop including a phase counter for providing a phase difference between said reconstructed clock signal and an internal clock signal and a signal processor;

a bit counter clocked by the internal clock signal;

said bit counter being initialized upon transmission of a predetermined signal, and stopped upon detection of the return of the predetermined signal transmitted back by the slave transceiver circuit;

a calculation circuit for receiving signals from both said phase counter and said bit counter for calculating the delay introduced by the telephone line based on the contents of the phase counter and the bit counter;

an input converter circuit for receiving the incoming bit flow;

and a memory coupled between said input converter circuit and said signal processor and having digital samples corresponding to the received bits being written at the rate of the reconstructed clock signal and having the samples read at the rate of the internal clock signal to be analyzed by the digital phase-locked loop;

whereby the detection of the return of the predetermined signal is generated at said signal processor.

15. The transceiver circuit of claim 14, wherein said memory comprises a FIFO-type memory.

16. The transceiver circuit of claim 14, wherein the delay is corrected according to the difference between the read and write pointers of the FIFO-type memory.

17. The transceiver circuit of claim 14, wherein said digital phase-locked loop also includes an adder.

* * * * *